H. HENLEY.
AGRICULTURAL BOILER.
No. 192,993. Patented July 10, 1877.
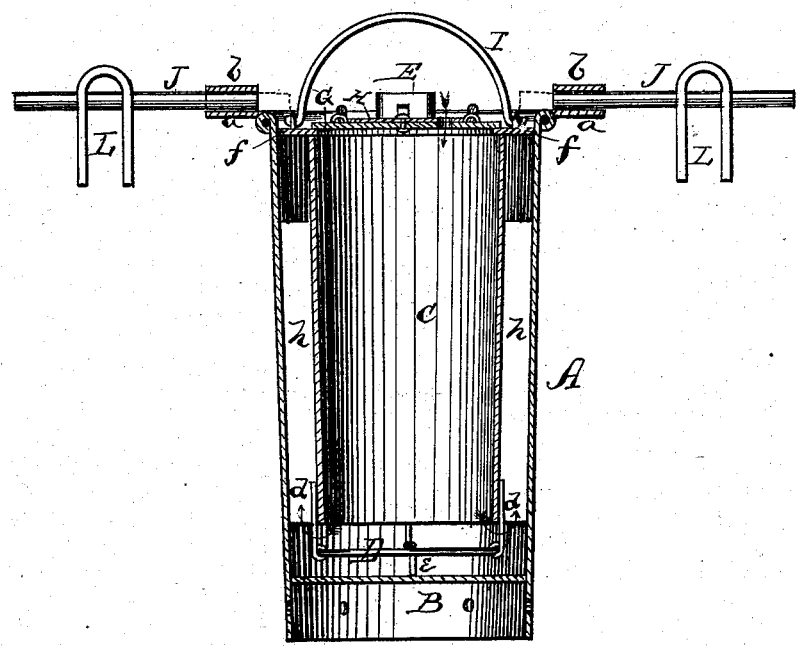
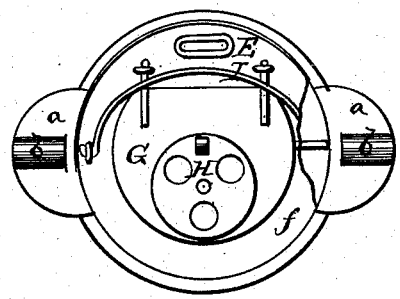
Witnesses
Inventor
Henry Henley;
per
J. H. Alexander & Co
Attorneys

UNITED STATES PATENT OFFICE.

HENRY HENLEY, OF BLOOMINGTON, INDIANA.

IMPROVEMENT IN AGRICULTURAL BOILERS.

Specification forming part of Letters Patent No. 192,993, dated July 10, 1877; application filed March 23, 1877.

*To all whom it may concern:*

Be it known that I, HENRY HENLEY, of Bloomington, in the county of Monroe and State of Indiana, have invented certain new and useful Improvements in Agricultural Boilers; and I do hereby declare that the following is a full, clear, and exact description thereof, reference being had to the accompanying drawings, and to the letters of reference marked thereon, which form part of this specification.

The nature of my invention consists in the construction and arrangement of a feed-cooker, as will be hereinafter more fully set forth.

In order to enable others skilled in the art to which my invention appertains to make and use the same, I will now proceed to describe its construction and operation, refering to the annexed drawing, in which—

Figure 1 is a vertical section of my feed-cooker, and Fig. 2 is a plan view of the same.

A represents the exterior sheet-iron vessel, provided below its bottom with a downwardly-projecting perforated rim, B. The perforations in this rim allow the escape of heat below the bottom of the vessel.

The vessel A is open at the top, and provided at opposite sides with projecting ears $a$, on which are horizontal sockets or tubes $b\ b$ extending radially, as shown.

C represents the magazine or fire-box, provided with a grate, D, rigidly connected below the lower end of the fire-box, and to the same by rods $d\ d$, and from the grate extend feet $e\ e$, which support both the grate and fire-box on the bottom of the vessel A.

The top of the fire-box C is provided with a circumferential rim or flange, $f$, which closes the space between it and the vessel A, and in this flange or rim is the smoke-exit pipe E.

G is a hinged lid or cover to the fire-box, provided with a draft-register, H, as shown. The fire-box is further provided on the top with a hinged bail or handle, I, by means of which the fire-box is easily removed from the exterior vessel whenever required. It has also on its sides vertical flanges $h\ h$ extending from the bottom upward for a suitable distance to conduct the heat and smoke all around the outside of the fire-box and prevent it from going directly up on the back to the smoke-exit.

The heat and smoke pass out at the bottom of the fire-box, envelop the same entirely, and go upward and out at E, heating the entire surface of the exterior vessel A.

J J are rods inserted in the sockets $b\ b$ sufficiently far to pass over the flange $f$ of the fire-box, and, as it were, lock the same in its place. Upon the projecting ends of these rods are placed clamps L L, which are in the form of an inverted U, and are intended to fit over the edges of the tub or other vessel in which the feed-cooker is used, thereby supporting the cooker in place. The rods J are also used as handles to lift the cooker out and in of the vessel or tub.

Having thus fully described my invention, what I claim as new, and desire to secure by Letters Patent, is—

1. The combination of the exterior vessel A, provided with perforated bottom rim B, the fire-box C, grate D, with connecting-rods $d$ and feet $e$, top rim $f$, with smoke-pipe E, and the lid G with register H, all substantially as and for the purposes herein set forth.

2. The rods J and U-shaped clamps L, in combination with the cooker A, having sockets $b$ and fire-box C, substantially as and for the purposes herein set forth.

In testimony that I claim the foregoing as my own I affix my signature in presence of two witnesses.

HENRY HENLEY.

Witnesses:
JERE. F. PITTMAN,
ZACHARIAH S. COFFIN.